YODER, GRUVER & GILLIFORD.
Seed Planter.
No. 5,834.  Patented Oct. 3, 1848.
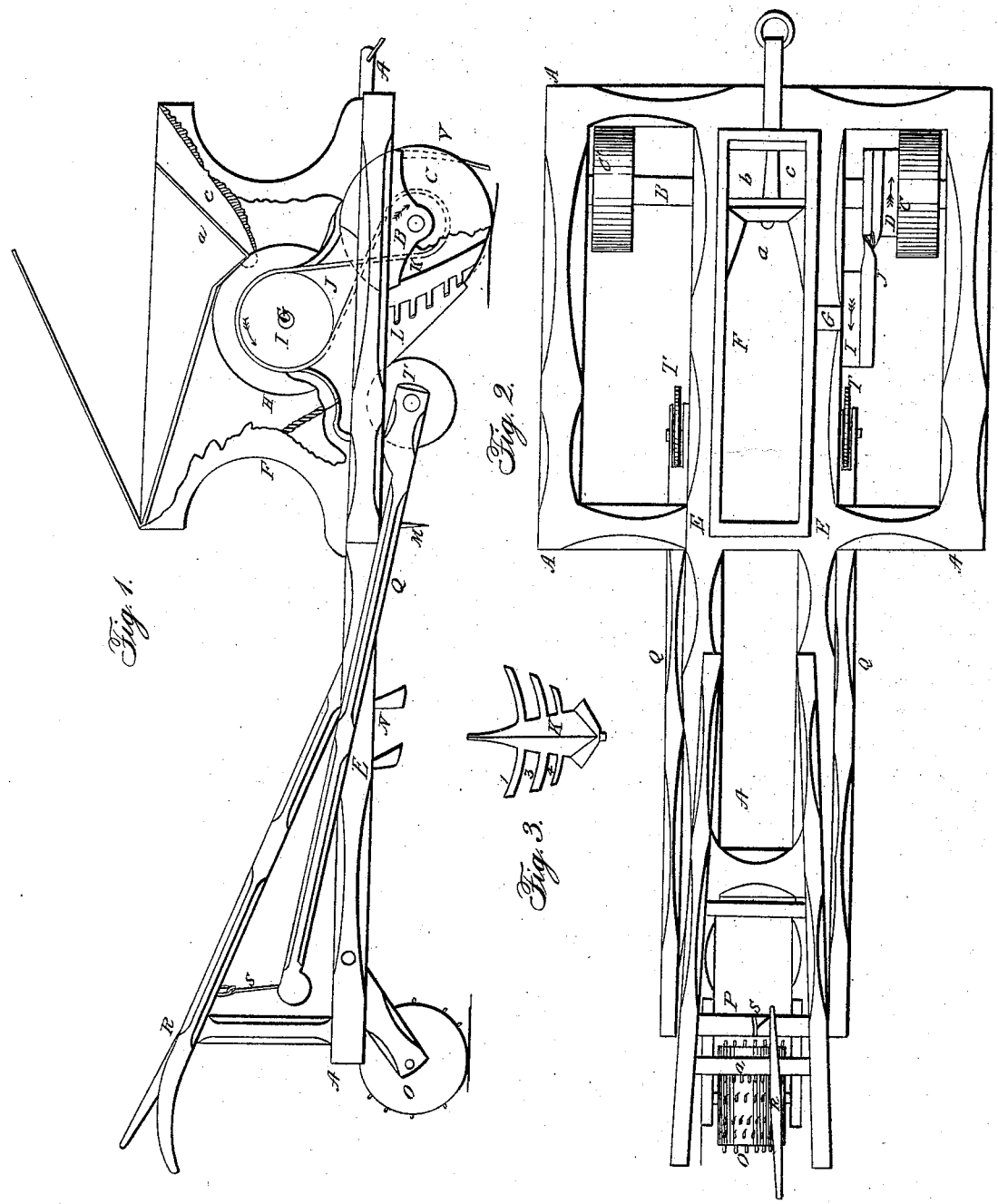

United States Patent Office.

J. GILLIFORD, E. GRUVER, AND J. YODER, OF JUNIATA COUNTY, PA.

IMPROVEMENT IN CORN-PLANTERS.

Specification forming part of Letters Patent No. 5,834, dated October 3, 1848.

*To all whom it may concern:*

Be it known that we, JOHN GILLIFORD, ELIAS GRUVER, and JACOB YODER, of the county of Juniata, in the State of Pennsylvania, have invented a new and useful Improvement in Seed-Planters; and we do hereby declare that the following is a full, clear, and exact description of the same, reference being had to the accompanying drawings, making a part of this specification, of which—

Figure 1 is a side view; Fig. 2, a plan or top view; Fig. 3, a front view of the plow.

To enable others skilled in the art to make and use our invention, we will proceed to describe its construction and operation.

A A represent the frame of the planter.

As far forward as convenient is placed an axle, B, under and transversely of the frame, kept in place by bearings secured to the under side of the side beams, on which are placed the propelling-wheels C C', revolving with the axle B. On this axle, and in contact with the wheel C, is fixed a pulley or band wheel, D.

On the top of the center beams, E, is located a dropping-box, F, Fig. 1, (one of the sides of the same being broken for the purpose of showing the inside,) through which passes a shaft, G, supported by the sides of the box, on which is firmly fixed a cylinder, H, of wood or other desirable material, having a chamber or orifice (represented by dotted lines) cut in its periphery for receiving the seed from the containing-chambers of the dropping-box.

On the outside of the box, on the shaft G, is fixed a pulley, $i$, and connected with the pulley D by an endless strap, J, crossed, in order that the pulleys shall rotate in contrary directions, as indicated by the arrows.

The upper portion of the dropping-box is divided into three chambers, $a$, $b$, and $c$, the bottom of the partition-boards of which come nearly in contact with the cylinder. In the bottom of these chambers are small apertures, through which the seed is received in the chamber of the cylinder. These apertures may be regulated in size to suit the description of seed it may be necessary or desirable to use.

Immediately under the cylinder, and fastened to a cross-piece connecting the center beams of the frame, is placed a skeleton plow, K, the point of which during the progress of the planter makes the furrow, while the arms or ribs 1 2 3 partly break the clods and also separate the earth from the sods, and allows the fine earth to sift through them into the furrow.

In the rear of the plow, fastened in any convenient manner to the center beams of the frame, is placed a funnel-shaped hopper, L, made of tin or sheet-iron, which receives the seed from the chamber of the cylinder and deposits them at regular intervals in the furrow. The clods not entirely broken by the ribs of the plow are then broken by two harrow-pins, M, situated in the rear of the hopper and set in the center beams of the frame.

For covering the seed we fasten to the center beams behind the harrow-pins two shovel-plows of ordinary construction. At the end of the center beams is attached a heavy roller, $o$, having pins or teeth arranged in rows on its circumference, which passes along the furrow covered by the shovel-plows and pulverizes the clods broken by the arms of the plow K and harrow-pins. To the center beam are fastened handles operating the machine.

Attached to the under side of the rear beam of the frame by hinges or other devices allowing them to vibrate are two levers, the longer arms of which reach nearly to the standards supporting the plow-handles, and are connected at their extremities by a cross-piece, P. This cross-piece is connected to a lever, R, attached to the cross-piece $a$ of the handles by a rod of iron, S.

To the shorter arms, extending under the frame, are attached two wheels, T T, about half the diameter of the driving-wheel. By depressing the lever R the wheels T T are brought in contact with the ground, and the weight of the whole machine resting on these wheels, it will be perceived that the driving-wheels C C' will immediately cease revolving, as also the cylinder H in the dropping-box F, and cause a suspension of the dropping of the seed. This arrangement is made to stop the revolution of the cylinder when turning into another row.

In advance of the point of the plow, and attached to the drawing-beam of the frame, is a spring-guard or colter, $v$, which protects the point of the plow from injury from stones or other obstructions in the ground, as it immediately springs back and covers the point of the plow when any obstruction opposes it, and remains in that position until the obstruction is removed or passed over.

Having thus fully described our invention, we do not claim any of the means or devices employed in transmitting the seed to the hopper and depositing it in the furrow, nor do we claim the shovel-plows, harrow-pins, or roller attached to the ends of the center beams; but

What we do claim, and desire to secure by Letters Patent, is—

1. The application and use of a skeleton or sifting plow operating for the purpose above specified.

2. The application and use of a spring-guard or colter for protecting the point of the plow from injury from stones and other obstructions, in the manner above set forth.

JOHN GILLIFORD.
ELIAS GRUVER.
JACOB YODER.

Witnesses:
AMONTUS J. HOWELL,
J. D. HOWELL.